United States Patent [19]

Nesheiwat

[11] Patent Number: 4,963,651

[45] Date of Patent: Oct. 16, 1990

[54] METHOD TO RECOVER POLY(ARYLENE SULFIDE)S WITH VAPORIZED LIQUIDS

[75] Inventor: Afif M. Nesheiwat, Chatham, N.J.

[73] Assignee: Phillips Petroleum Company, Bartlesville, Okla.

[21] Appl. No.: 349,561

[22] Filed: May 8, 1989

Related U.S. Application Data

[63] Continuation-in-part of Ser. No. 224,265, Jul. 25, 1988, abandoned, which is a continuation of Ser. No. 104,613, Oct. 5, 1987, abandoned.

[51] Int. Cl.$^5$ .............................................. C08G 75/18
[52] U.S. Cl. ................................... 528/483; 528/388; 528/480; 528/494; 528/495; 528/499
[58] Field of Search ............... 528/483, 480, 494, 495, 528/499, 388

[56] References Cited

U.S. PATENT DOCUMENTS

| | | | |
|---|---|---|---|
| 3,354,129 | 11/1967 | Edmonds, Jr. et al. | 260/79 |
| 3,793,256 | 2/1974 | Scoggins | 260/79 |
| 3,839,302 | 10/1974 | Miles | 260/79 |
| 3,919,177 | 11/1975 | Campbell | 260/79.1 |
| 3,956,060 | 5/1976 | Scoggins | 159/47 R |
| 4,321,358 | 3/1982 | Zelinski | 528/388 |
| 4,415,729 | 11/1983 | Scoggins et al. | 528/388 |
| 4,748,231 | 5/1988 | Nesheiwat | 528/486 |

*Primary Examiner*—Harold D. Anderson
*Attorney, Agent, or Firm*—Williams, Phillips & Umphlett

[57] ABSTRACT

A method is provided for recovering poly(arylene sulfide) from a liquid reaction mixture, comprising a liquid-phase poly(arylene sulfide) and a polar organic compound which can also function as a solvent for the polymer, and water. The liquid reaction mixture is contacted by an amount of a vaporized phase separation agent at least sufficient to effect or enhance a phase separation of the liquid-phase poly(arylene sulfide) component from the polar organic compound. The poly(arylene sulfide resins recovered according to this invention exhibit greater particle size than those recovered according to prior art methods, and do not tend to adhere to vessel walls during recovery.

13 Claims, 1 Drawing Sheet

FIG. 1

METHOD TO RECOVER POLY(ARYLENE SULFIDE)S WITH VAPORIZED LIQUIDS

CROSS-REFERENCE TO RELATED APPLICATIONS

This application is a continuation-in-part of application Ser. No. 224,265, filed July 25, 1988, which is in turn a continuation of application Ser. No. 104,613, filed Oct. 5, 1987, both now abandoned.

FIELD OF THE INVENTION

This invention relates to processes for the production of polymers from aromatic compounds. In a broad aspect, this invention relates to processes for the production and recovery of crystalline, semi-crystalline, and amorphous poly(arylene sulfide) polymers.

BACKGROUND OF THE INVENTION

A basic process for the production of crystalline, semi-crystalline, and amorphous poly(arylene sulfide) polymers from polyhalo-substituted aromatic compounds, wherein the halogen atoms attached to ring carbon atoms react with an alkali metal sulfide in a polar organic compound at an elevated temperature, is generally known in the art. Due to a continually growing attractiveness towards thermoplastic polymeric resins, a great amount of work has been completed which resulted in the disclosure of methods for both batch and continuous operations to produce crystalline, semi-crystalline, and amorphous poly(arylene sulfide)s from polyhaloaromatic compounds having at least two halogen substituents per molecule. Certain processes for producing crystalline, semi-crystalline and amorphous poly(arylene sulfide) resins result in a liquid reaction mixture comprising a liquid-phase polymer and a polar organic compound which can also function as a solvent for the polymer. Certain other processes for producing poly(arylene sulfide) resins result in a slurry reaction mixture comprising a solid-phase polymeric resin dispersed in a polar organic compound. In order for the polymers produced in these processes to be useful in commercial applications, the polymers must first be recovered from the reaction mixture.

One method of recovering the crystalline and semi-crystalline poly(arylene sulfide) resins from the reaction mixture is by a process referred to as the "flash recovery method". In this process the polar organic compound which can also function as a solvent for the polymer and non-polymeric components of the reaction mixture are vaporized, leaving behind the polymer and non-volatile components. The polymer recovered by this process is generally in the form of a powdery resin. This powdery resin has, among other things, (1) proven to be difficult to filter, (2) resulted in a product that when dried is excessively dusty, (3) necessitated pelletizing the powder for extrusion purposes, and (4) resulted in other problems commonly associated with products of relatively low bulk density.

Increasing the particle size of the powder-like particulate crystalline and semi-crystalline poly(arylene sulfide) resin recovered by the flash recovery method would alleviate most of the aformentioned problems. Therefore, one object of this invention is to provide a method for recovering particulate crystalline and semi-crystalline poly(arylene sulfide) resins from a reaction mixture comprising a liquid-pahse poly(arylene sulfide) and a polar organic compound which can also function as a solvent for the polymer, wherein the particle size distribution of the recovered resins result in improved filterability and reduced dustiness as compared to resins recovered by flash recovery methods.

Another object of this invention is to provide a method for recovering particulate crystalline and semi-crystalline poly(arylene sulfide) resins from a reaction slurry comprising a solid-phase poly(arylene sulfide) dispersed in a polar organic compound, wherein the bulk density of the recovered resins is increased as compared to resins recovered by flash recovery methods.

Another process used for the recovery of crystalline, semi-crystalline, and amorphous poly(arylene sulfide) resins from a reaction mixture is the addition of a liquid functioning as a phase separation agent. This liquid should be soluble in the reaction mixture and a nonsolvent of the polymeric resin. When a phase separation agent in the form of a liquid is used to recover the polymer from the reaction mixture, the process results in the recovery of a polymer in the form of relatively large, coarse particles. It should be noted, however, that some of these resin particles agglomerate into large chunks and/or adhere onto the internal walls of the polymerization reactor. Therefore, it is another object of this invention to provide a method for recovering particulate crystalline, semi-crystalline, and amorphous poly(arylene sulfide) resins from a reaction mixture or liquid mixture comprising a liquid-phase poly(arylene sulfide) and a polar organic compound which can also function as a solvent for the polymer, and optionally water, wherein the resulting polymeric particles are uniform in size and do not tend to adhere to each other or to the internal parts of the reaction vessel.

It is yet another object of this invention to provide a method for recovering particulate crystalline, semi-crystalline, and amorphous poly(arylene sulfide) resins from a reaction slurry comprising a solid-phase poly(arylene sulfide) resin dispersed in a polar organic compound or a slurry prepared by slurrying an already formed resin in a polar organic compound, wherein the resulting polymeric particles are uniform in size and do not tend to adhere to each other or to the internal parts of the reaction vessel.

STATEMENT OF THE INVENTION

In accordance with one embodiment of this invention, a method is provided for recovering a particulate crystalline, semi-crystalline, or amorphous poly(arylene sulfide) polymer from a completed polymerization reaction resulting in a liquid reaction mixture comprising a liquid-phase poly(arylene sulfide), a polar organic compound which can also function as a solvent for the polymer, and water. For purposes herein, the term "completed polymerization reaction" is meant to denote that point at which the polymer is recovered, regardless of whether all reactants have been consumed. Specifically, the liquid reaction mixture is contacted by an amount of a vaporized phase separation agent at least sufficient to effect a phase separation between the poly(arylene sulfide) and the polar organic compound which can also function as a solvent. The vaporized phase separation agent comprises a vaporized liquid which, when in its liquid-phase, is characterized as being (1) soluble in the polar organic compound, and (2) a nonsolvent or a poor solvent of the poly(arylene sulfide), and (3) able to effect or enhance a phase separation between the liquid-phase polymer and the polar organic compound which can also function as a solvent. A subsequent reduction in the temperature of the reactor contents produces a slurry comprising a particulate crystalline, semi-crystalline, or amorphous poly(arylene sulfide) resin and the polar organic compound which can also function as a solvent for the polymer. The polymeric particles recovered from the reaction mixture slurry are uniform in size and do not tend to adhere to each other or to the internal parts and walls of the reaction vessel.

In another embodiment, wherein a completed polymerization reaction results in a reaction slurry comprising a particulate poly(arylene sulfide) resin dispersed in a polar organic compound, and water, the particulate resin is substantially liquified to form a liquid mixture. The liquid mixture comprising the substantially liquified poly(arylene sulfide), a polar organic compound, and water, is contacted by an amount of a vaporized phase separation agent at least sufficient to effect a phase separation between the liquid-phase poly(arylene sulfide) and the polar organic compound which can also function as a solvent. Subsequent reduction of the temperature of the reactor contents produces a slurry comprising a particulate poly(arylene sulfide) resin. The polymeric particles recovered from the reaction slurry are uniform in size and do not tend to adhere to each other or to the internal parts and walls of the reaction vessel.

In yet another embodiment of this invention, a method is provided for increasing the bulk density of a particulate, semi-crystalline, or amorphous poly(arylene sulfide) polymer, which method comprises contacting a liquid mixture formed by dissolving or slurrying an already prepared poly(arylene sulfide) resin in a polar organic compound, and if necessary, substantially liquifying the resin, with an effective amount of a vaporized phase separation agent, then subsequently reducing the temperature of the liquid mixture to produce a slurry comprising a particulate poly(arylene sulfide) resin dispersed in the polar organic compound. The polymeric particles recovered from the slurry are uniform in size and have an increased bulk density over those of the starting resin.

A more complete appreciation of the invention and many attendant advantages thereof will be readily obtained by reference to the following detailed description when considered in connection with the accompanying figure briefly described below.

DETAILED DESCRIPTION OF THE INVENTION

In one embodiment, the process of the present invention is suitable for use in recovering crystalline, semi-crystalline, and amorphous poly(arylene sulfide) resins produced by any method that results in a reaction mixture comprising a liquid-phase poly(arylene sulfide), a polar organic compound which can also function as a solvent for the polymer and, optionally, water.

In another embodiment, the process of this invention is also suitable for use in recovering crystalline, semi-crystalline, and amorphous poly(arylene sulfide) resins produced by any method that results in a reaction slurry comprising a solid-phase poly(arylene sulfide) dispersed in a polar organic compound which can also function as a solvent for the polymer, and water, wherein the particulate resin can be placed into its liquid-phase without degrading the polymer.

Examples of processes that will produce reaction mixtures which can be treated by the process of this invention are those wherein polyhalo-substituted aromatic compounds are reacted with sulfur-containing reactants and a polar organic compound which can also function as a solvent for the polymer, optionally with polymerization modifying compounds, either in batch or continuous operations. Reaction mixtures wherein the components are premixed to form complexes before all of the components are brought together under polymerization conditions can also be used.

Preferably, the arylene sulfide polymers treated by the process of this invention are phenylene sulfide polymers. The process of this invention can be used to recover crystalline, semi-crystalline, and amorphous phenylene sulfide polymers selected from the group comprising poly(phenylene sulfide), poly(phenylene sulfide sulfone), poly(phenylene sulfide ketone), and poly(phenylene sulfide diketone).

This invention provides a method for converting a liquid-phase or solid-phase poly(arylene sulfide) polymer in a liquid reaction mixture into relatively large, coarse particles which are uniform in size, are readily separable from the other components of the reaction mixture, and do not tend to adhere to each other or to the internal parts or walls of the polymerization reactor. Specifically, by contacting the liquid reaction mixture comprising the liquid-phase poly(arylene sulfide) polymer with an amount of a suitable vaporized phase separation agent at least sufficient to effect a phase separation beween the polar organic compound which can also function as a solvent for the polymer, and the liquid-phase poly(arylene sulfide), a particulate polymer having the improved characteristics described above can be recovered.

At the completion of the polymerization reaction, the crystalline, semi-crystalline, or amorphous poly(arylene sulfide) can be present in the polymerization reaction mixture in either a liquid-phase or a solid-phase. When the completed polymerization reaction results in a liquid reaction mixture comprising a liquid-phase poly(arylene sulfide) and a polar organic compound, the vaporized separation agent can be added without any modification of the mixture. An example of a process of this type includes, but is not limited to, the synthesis of poly(arylene sulfide) resins such as poly(phenylene sulfide) and poly(arylene sulfide sulfone) resins.

However, when the completed polymerization reaction results in a reaction mixture slurry comprising a particulate solid-phase poly(arylene sulfide) resin dispersed in a polar organic compound, the resin must be substantially liquified prior to the addition of the vaporized separation agent. One method of liquifying a particulate crystalline, semi-crystalline, or amorphous poly(arylene sulfide) slurried in a completed polymerization reaction mixture includes, but is not limited to, heating the reaction mixture slurry to an elevated temperature. It is noted, that since the particulate crystalline, semi-crystalline, or amorphous poly(arylene sulfide) is dispersed in a polar organic compound which can also function as a solvent of the resin, the elevated temperature of the subsequent liquification process need not necessarily exceed the melting point of the resin. Another method of liquifying the particulate crystalline, semi-crystalline, or amorphous poly(arylene sulfide) resin is to add an additional solvent to the reaction slurry. Depending upon the type and amount of solvent being added, it may also be necessary to elevate the temperature of this reaction mixture in order to liquify the particulate polymeric resin. Examples of when a polymer liquification process might be required would include, but are not limited to, the synthesis of poly(arylene sulfide ketone)s and poly(arylene sulfide diketone)s.

The vaporized separation agent suitable for use in the process of this invention can be any one which in its liquid-phase has the following characteristics: (1) soluble in the polar organic compound which can also function as a solvent of the polymer used in the reaction mixture; and (2) a nonsolvent of the poly(arylene sulfide), and (3) able to effect a phase separation between the liquid-phase polymer and the remaining liquid components of the reaction mixture, or mixture formed by dissolving an already formed poly(arylene sulfide) resin in a polar organic compound. Examples of suitable liquids which can be used as vaporized separation agents include, but are not limited to, the following: water; paraffinic hydrocarbons; higher boiling alcohols; higher boiling ethers; and the like, and mixtures thereof. Vaporized water (i.e., steam) is the presently preferred vaporized separation agent.

In some instances, the polymerization reaction results in an amount of water (a separation agent) being present in the reaction mixture. Depending upon the polymerization process and the poly(arylene sulfide) being synthesized, the amount of water (phase separation agent) present in a reaction mixture can range from an undetectable amount to an amount which is at least sufficient to effect or enhance a phase separation between the liquid-phase poly(arylene sulfide) and the polar organic compound which can also function as a solvent for the polymer. However, in order to recover poly(arylene sulfide) resins having greater particle size, it is generally necessary to add an additional amount of a separation agent. In general, the amount of vaporized separation agent required to be added is affected by (1) the amount of separation agent already present in the reaction mixture, (2) the amount of poly(arylene sulfide) polymer present in the reaction mixture, (3) the amount of polar organic compound which can also function as a solvent for the polymer which is present in the reaction mixture, (4) the degree of crystallinity exhibited by the poly(arylene sulfide) sulfide polymer when in its annealed, solid state, (5) the presence of any other species in the reaction mixture which can affect phase separation and (6) the particle size desired for the resulting phase-separated poly(arylene sulfide) polymer. More specifically, relatively larger amounts of phase separation agent will generally produce relatively larger particle size in the resulting phase-separated poly(arylene sulfide) polymer, relatively more phase separation agent is required for relatively less crystalline poly(arylene sulfide) polymers, relatively less phase separation agent is required the more phase separation agent is already present in the reaction mixture at the end of polymerization and relatively more phase separation agnet is required the more poly(arylene sulfide) polymer and/or polar organic compound which can also function as a solvent for the polymer which are present in the polymerization mixture at the end of polymerization. The presence of modifying agents, such as, for example, alkali metal carboxylates, can reduce the amount of separation agent needed to recover the polymer particles. One skilled in the art can readily determine the amount of vaporized phase separation agent required based on the particle size desired and the specific polymerization reaction mixture to be treated. For poly(arylene sulfides) such as poly(phenylene sulfide), a semi-crystalline poly(arylene sulfide), prepared under typical polymerization conditions such as those described in U.S. Pat. No. 3,354,129 and U.S. Pat. No. 3,919,177, the molar sum of (1) any phase sepration agent present in the liquid reaction mixture, at the completion of the polymerization reaction and (2) the vaporized phase separation agent subsequently added to the liquid reaction mixture, must be at least equal to the moles of poly(arylene sulfide) polymer present in the liquid reaction mixture. In general, the molar ratio of the vaporized separation agent to the moles of poly(arylene sulfide) present in the liquid reaction mixture ranges from about 0.1:1 to about 100:1, depending upon the amount of phase separating agent present at the end of the polymerization reaction and the molar ratio of said vaporized separation agent to said polar organic compound ranges from about 0.001:1 to about 10:1. Preferably, the molar ratio of the vaporized separation agent to the moles of poly(arylene sulfide) present in the reaction mixture ranges from about 0.5:1 to about 5:1, more preferably, from about 1:1 to about 3:1.

After a sufficient amount of vaporized separation agent has been added to the liquid reaction mixture, such that an effective amount of a separation agent is present, the temperature of the liquid reaction mixture is lowered to the range in which the liquid-phase poly(arylene sulfide) resin solidifies. This transitional temperature differs with the type of polymer involved, and is readily determined by one of ordinary skill in the art. For example, the transitional temperature of a poly(phenylene sulfide) polymer is in the range of about 410° F.±20° F. (210° C.±11° C.). Described in another way, when the temperature of the liquid reaction mixture comprising the liquid-phase poly(phenylene sulfide) is decreased from its polymerization reaction temperature (i.e., from about 425° F. (218° C.) to about 525° F. (274° C.)) to a temperature below the resin's transition temperature (i.e., from about 430° F. (221° C.) to about 390° F. (199° C.)), the liquid-phase poly(phenylene sulfide) will begin to solidify.

In contrast, poly(phenylene sulfide ketone) resins have a polymerization reaction temperature generally ranging from about 450° F. (232° C.) to about 550° F. (288° C.). As stated earlier, the synthesis of poly(phenylene sulfide ketone) results in a reaction mixture slurry comprising a solid particulate resin dispersed in a polar organic compound which can also function as a solvent for the polymer. To practice this invention, the particulate resin must first be substantially liquified. The presently preferred method of liquifying poly(phenylene sulfide ketone)s is by heating the reaction mixture slurry to a temperature in the range from about 550° F. (288° C.) to about 600° F. (316° C.).

After the resin has been substantially liquified and the phase separation agent added, the temperature of the now liquid reaction mixture is lowered to a point below the resin's transitional temperature. The liquid to solid phase transitional temperature of poly(phenylene sulfide ketone) is about 475° F.±25° F. (246° C.±14° C.).

Therefore, when using the above liquification means to solidify liquid-phase poly(phenylene sulfide ketone) from the liquid mixture, the temperature of the liquid reaction mixture is decreased from a temperature ranging from about 550° F. (288° C.) to about 600° F. (316° C.) to a temperature below the resin's transition temperature (i.e., from about 500° F. (260° C.) to about 450° F. (232° C.)).

Poly(phenylene sulfide diketone) resins have a reaction temperature generally ranging from 450° F. (232° C.) to about 525° F. (274° C.). As stated earlier, the synthesis of poly(phenylene sulfide diketone) results in a reaction mixture slurry comprising a solid particulate resin dispersed in a polar organic compound. To practice this invention, the solid particulate resin must first be substantially liquified. The presently preferred method of liquifying poly(phenylene sulfide diketone)s is to heat the reaction mixture slurry to a temperature in the range from about 650° F. (343° C.) to about 700° F. (371° C.). After the resin has been substantially liquified, the temperature of the now liquid reaction mixture is lowered to a point below the resin's transitional temperature. The liquid to solid phase transitional temperature of poly(phenylene sulfide diketone) is about 575° F.±25° F. (302° C.±14° C.). Therefore, when using the above-described liquification means to solidify liquid-phase poly(phenylene sulfide diketone) from the liquid reaction mixture, the temperature of the liquid reaction mixture is decreased from a temperature ranging from about 650° F. (343° C.) to about 700° F. (371° C.) to a temperature below the resin's transition temperature (i.e., from about 600° F. (316° C.) to about 550° F. (288° C.).

In general, the crystalline, semi-crystalline, and amorphous poly(arylene sulfide) polymers treated by the process of this invention are produced by contacting under polymerization conditions a dihaloaromatic compound, such as for example a dihalobenzene, with a sulfur source and a polar organic compound.

For example, the dihalobenzenes which can be employed are often p-dihalo compounds represented by the formula wherein each X is selected from the group comprising chlorine, bromine, and iodine, and each R is selected from the group comprising hydrogen and hydrocarbyl in which the hydrocarbyl can be an alkyl, cycloalkyl, or aryl radical or combination thereof such as alkylaryl, arylalkyl, or the like, wherein the total number of carbon atoms in each molecule is within the range of 6 to about 24, with the proviso that, in at least 50 mole-percent of the p-dihalobenzene employed, R is hydrogen. In order to prepare the poly(arylene sulfide sulfone)s useful in this invention, a dihaloaromatic sulfone is employed as the dihaloaromatic compound. In order to prepare the poly(arylene sulfide ketone)s or poly(arylene sulfide diketone)s useful in this invention, dihaloaromatic ketones and diketones are employed. Optionally, components such as polyhaloaromatic compounds having more than two halogen substituents per molecule, and/or polymerization modifying compounds, such as for example alkali metal carboxylates or lithium halides can also be added. Some of the more common components used in producing these reaction mixtures are listed below.

Some examples of dihaloaromatic compounds which can be employed include, but are not limited to, the following: dihalobenzenes such as p-dichlorobenzene (DCB); p-dibromobenzene; p-diiodobenzene; 0-dichlorobenzene; m-dichlorobenzene; m-dibromobenzene; 1-chloro-4-bromobenzene; 1-chloro-4-iodobenzene; 1-chloro-3-bromobenzene; 1-bromo-4-iodobenzene; 2,5-dichlorotoluene; 2,4-dichlorotoluene; 2-chloro-4-iodotoluene; 2,5-dichloro-p-xylene; 1-ethyl-4-isopropyl-2,5-dibromobenzene; 1,2,4,5-tetramethyl-3,6-dichlorobenzene; 1-butyl-4-cyclohexyl-2,5-dibromobenzene; 1-hexyl-3-dodecyl-2,5-dichlorobenzene; 1-hexyl-3-cyclohexyl-2,4-dibromobenzene; 1-octadecyl-2,5-diiodobenzene; 1-phenyl-2-chloro-5-bromobenzene; 1-(p-tolyl)-2,5-dibromobenzene; 1-benzyl-2,5-dichlorobenzene; and 1-octyl-4-(3-methyl-cyclopentyl)-2,5-dichlorobenzene; dihaloaromatic sulfones such as bis(p-chlorophenyl) sulfone; bis(p-bromophenyl) sulfone; bis-(0-bromophenyl) sulfone; bis(m-iodophenyl) sulfone; bis(p-iodophenyl) sulfone; p-chlorophenyl p-bromophenyl sulfone; m-bromophenyl 0-chlorophenyl sulfone; p-iodophenyl 3-methyl-4-bromophenyl sulfone; p-chlorophenyl-0-bromophenyl sulfone; bis(2-methyl-4-chlorophenyl) sulfone; bis(2,5-diethyl-4-bromophenyl) sulfone; bis(3-isopropyl-4-iodophenyl) sulfone; bis(2,5-dipropyl-4-chlorophenyl) sulfone; bis(2-butyl-4-bromophenyl) sulfone; bis(2,3,5,6-tetramethyl-4-chlorophenyl) sulfone; 2-isobutyl-4-chlorophenyl 3-butyl-4-bromophenyl sulfone; 2-isobutyl-3-chlorophenyl 3butyl-2-bromophenyl sulfone; 1,4-bis(p-chlorophenylsulfonyl)benzene; 1-methyl-2,4-bis(p-bromophenylsulfonyl)benzene; 2,6-bis(p-bromophenylsulfonyl)naphthalene; 2,6-bis(m-iodophenylsulfonyl)naphthalene; 7-ethyl-1,5-bis(p-iodophenylsulfonyl)naphthalene; 4,4'-bis(p-chlorophenylsulfonyl)biphenyl; bis[p-(p-bromophenylsulfonyl)phenyl] ether; bis[p-(0-chlorophenylsulfonyl)phenyl] ether; bis[p-(p-chlorophenylsulfonyl)phenyl] sulfide; bis[m-(0-chlorophenylsulfonyl)phenyl] sulfide; bis[p-(p-chlorophenylsulfonyl)phenyl] sulfone; bis[p-(p-bromophenylsulfonyl)-phenyl)] methane; and 5,5-bis[3-ethyl-4-(p-chlorophenylsulfonyl)-phenyl]nonane; and dihalobenzophenones such as 4,4'-dichlorobenzophenone; 3,4'-dichlorobenzophenone; 3,3'-dibromobenzophenone; 4,4'-dibromobenzophenone; 2-chloro-3'-iodobenzophenone; 4,4'-diiodobenzophenone; 2,4'-dichlorobenzophenone; and the like and mixtures thereof.

Generally, an alkali metal hydrosulfide is employed as the sulfur source. Examples of alkali metal hydrosulfides which can be employed include, but are not limited to, the following: lithium hydrosulfide; sodium hydrosulfide (NaSH); potassium hydrosulfide; rubidium hydrosulfide; cesium hydrosulfide; and mixtures thereof. Preferably, the alkali metal hydrosulfide is used as a hydrate or as an aqueous mixture. If desired, the alkali metal hydrosulfide can be prepared as an aqueous solution by the reaction of an alkali metal hydroxide with an alkali metal sulfide in aqueous solution. Examples of the alkali metal hydroxides which can optionally be employed include, but are not limited to, the following: lithium hydroxide; sodium hydroxide (NaOH); potassium hydroxide; rubidium hydroxide; cesium hydroxide; and mixtures thereof.

Polyhaloaromatic compounds having more than two halogen substituents per molecule can also optionally be employed. These compounds can be represented by the formula wherein each X' is a halogen, preferably chlorine; n is an integer from 3 to 6; and R' is a polyvalent aromatic radical of valence n which can have up to about 4 methyl substituents. The total number of carbon atoms in R' are within the range of 6 to about 16.

Some specific examples of polyhaloaromatic compounds having more than two halogen substituents per molecule include, but are not limited to, the following: 1,2,3-trichlorobenzene; 1,2,3,5-tetrabromo-benzene; hexachlorobenzene; 1,3,5-trichloro-2,4,6-trimethylbenzene; 2,2',4,4'-tetrachlorobiphenyl; 2,2',6,6'-tetrabromo-3,3',5,5'-tetramethylbiphenyl; 1,2,3,4-tetrachloronaphthalene; 1,2,4-tribromo-6-methylnaphthalene; 2,4,4'-trichlorobenzophenone, 2,4,4'-triiodobenzophenone, 2,4,4'-tribromobenzophenone, and the like, and mixtures thereof.

Various modifying agents can optionally be added such as alkali metal carboxylates or lithium halides. The alkali metal carboxylates which can optionally be employed can be represented by the formula wherein R" is a hydrocarbyl radical selected from the group comprising alkyl, cycloalkyl, and aryl, and combinations thereof such as alkylaryl, arylalkyl, and the like. The number of carbon atoms in said R" is within the range from 1 to about 20; and M is an alkali metal selected from the group comprising lithium, sodium, potassium, rubidium, and cesium. If desired, the alkali metal carboxylate can also optionally be employed as a hydrate, as a solution, or as a dispersion in water.

Examples of alkali metal carboxylates which can optionally be employed include, but are not limited to, the following: lithium Examples of alkali metal carboxylates which can optionally be employed include, but are not limited to, the following: lithium acetate; sodium acetate (NaOAc); potassium acetate; lithium propionate; sodium propionate; lithium 2-methyl-propionate; rubidium butyrate; lithium valerate; sodium valerate; cesium hexanoate; lithium heptanoate; lithium 2-methyloctanoate; potassium dodecanoate; rubidium 4-ethyltetradecanoate; sodium octanoate; sodium heneiocosanoate; lithium cyclohexanecarboxylate; sodium 3-methylcyclopentanecarboxylate; potassium cyclohexylacetate; potassium benzoate; lithium benzoate; sodium benzoate; potassium m-toluate; lithium phenylacetate; sodium 4-phenylcyclohexanecarboxylate; potassium p-tolylacetate; lithium 4-ethylcyclohexylacetate; and the like, and mixtures thereof.

If used, the amount of alkali metal carboxylate added is generally in the range from about 0.05 to about 4, preferably from about 0.1 to about 2 gram-moles of carboxylate per gram-mole of p-dihalobenzene or other dihaloaromatic.

Examples of the lithium halides which can optionally be employed include, but are not limited to, the following: lithium chloride; lithium bromide; lithium iodide; and mixtures thereof.

The polar organic compounds (which can also function as solvents for the polymer) useful in the preparation of polymers recovered by the process of this invention are those which can also function as solvents for both the polyhaloaromatic compounds and the alkali metal sulfides used. Examples of such polar organic compounds which can also function as solvents include, but are not limited to, the following: amides, including lactams; and sulfones. Examples of suitable polar organic compounds which can also function as solvents include hexamethylphosphoramide; tetramethylurea; N,N'ethylene-dipyrrolidone; N-methyl-2-pyrrolidone (NMP); pyrrolidone; 1,3-di-methyl-2-imidazoladinone; caprolactam; N-ethylcaprolactam; sulfolane; N,N-dimethylacetamide; low molecular weight polyamides; and the like. The polar organic compound which can also function as a solvent presently preferred is N-methyl-2-pyrrolidone (NMP).

Figure 1:
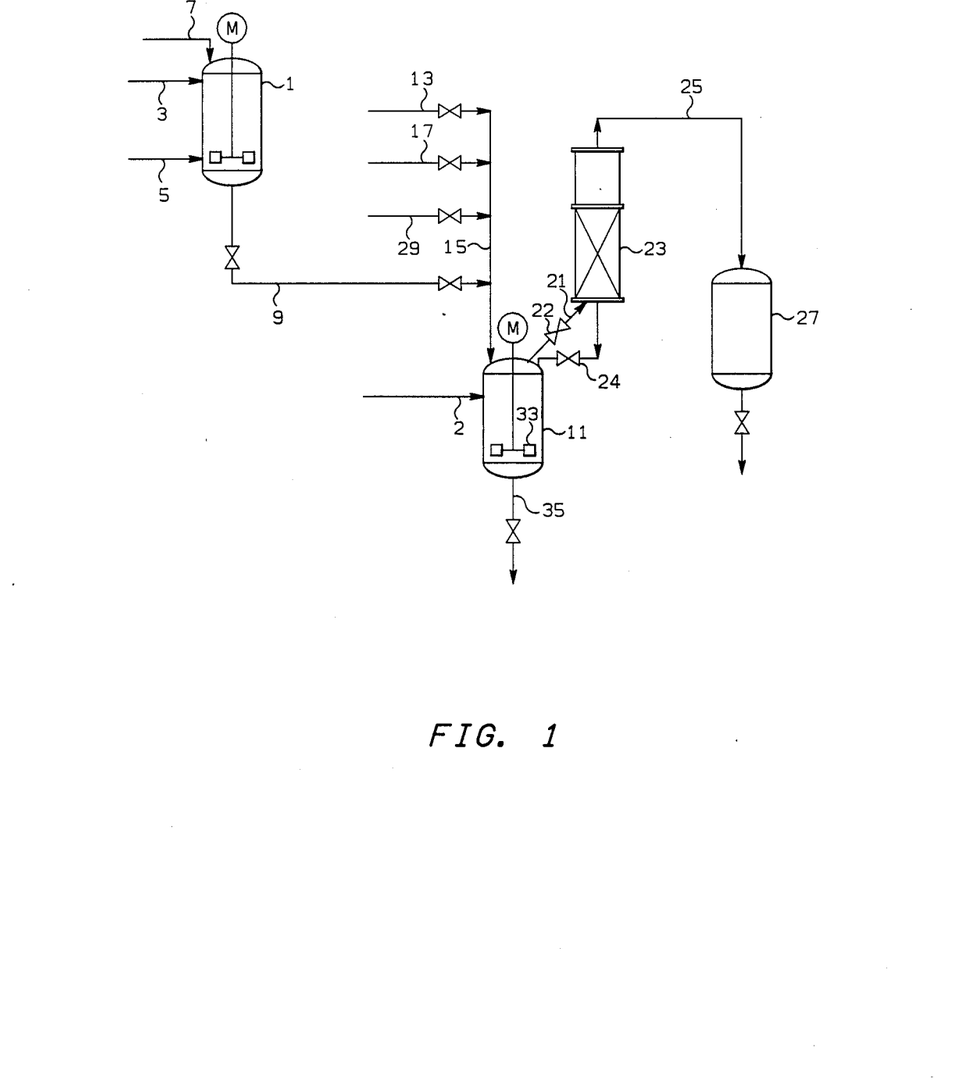
FIG. 1 is a schematic representation of a process for producing a polymerization reaction mixture comprising a poly(arylene sulfide) polymer, a polar organic compound which can also function as a solvent for the polymer, and water; and for recovering a crystalline, semi-crystalline, or amorphous polymer according to the proces of this invention.

To further demonstrate the operation of the present invention, a polymerization reaction process is described below. The polymerization process is illustrated by FIG. 1 which is a schematic representation of a process for producing and recovering poly(arylene sulfide) resins (e.g., poly(phenylene sulfide)) by the process of this invention.

In certain poly(arylene sulfide) preparations, such as the preparation of poly(phenylene sulfide), a dehydration step can be performed prior to any polymerization. In other poly(arylene sulfide) resin preparations, no dehydration is necessary. The following description includes for illustration a dehydration step. One of ordinary skill in the art can omit this step when it is unnecessary. Referring now to FIG. 1, aqueous solutions of a base (e.g., NaOH) and an alkali metal hydrosulfide (e.g., NaSH) are fed into stirred vessel 1 through lines 3 and 5, respectively. A polar organic compound which can also function as a solvent (e.g., NMP) is fed through line 7 into stirred vessel 1 to flush all of the material from vessel 1 through line 9 into stirred vessel 11, which serves as a dehydration/polymerization reactor.

An alkali metal carboxylate (e.g. NaOAc) and a second charge of a polar organic compound which can also function as a solvent are fed through lines 17 and 13 into line 15 which introduces these components into the dehydration/polymerization vessel 11. The contents of vessel 11 are then heated to a temperature sufficient to dehydrate the mixture therein. Rising vapors, passing through line 21, are fractionated in the distillation column 23. Condensed water vapor is passed through line 25 to be collected in dehydration accumulator 27.

After the dehydration process, the distillation column 23 is isolated from vessel 11 by the closing of valves 22 and 24. The monomer (e.g., DCB) is then added through line 29 into line 15, which introduces the monomer into vessel 11. The mixture within vessel 11 is then heated to a temperature sufficient to effect the polymerization of the reactive components.

After the polymerization reaction is completed, a vaporized separation agent (e.g., steam) is introduced into vessel 11 through line 2. It should be noted that vaporization of the liquid separation agent can be accomplished through any suitable process. One example of such a suitable process includes, but is not limited to, passing the liquid separation agent through a heating means.

After a sufficient amount of the vaporized separation agent which is at least sufficient to effect or enhance the separation of the liquid-phase polymer from the remaining liquid componenets in vessel 11 is added, the liquid reaction mixture is vigorously stirred by agitator 33. The internal temperature of vessel 11 is then slowly reduced so that the now separated liquid-phase polymer gradually begins to solidify. After the internal temperature of vessel 11 has been lowered to a point below the transitional temperature of the polymer, the result is a reaction mixture slurry comprising large, uniformly-sized particulate polymer dispersed in the polar organic compound. This reaction mixture slurry is then removed from vessel 11 through line 35. The particulate resin is then recovered from the reaction mixture slurry, washed, filtered, and dried using conventional methods. The polymeric resin recovered by the process of this invention does not tend to agglomerate into large chunks or adhere to the internal walls or parts of vessel 11.

The process has been described in terms of a typical poly(arylene sulfide) resin preparation, (i.e. poly(phenylene sulfide)). Those of ordinary skill in the art will readily understand that poly(arylene sulfide) resins such as poly(arylene sulfide sulfones), poly(arylene sulfide ketones) and poly(arylene sulfide diketones) can be prepared according to the process illustrated in FIG. 1 with certain modifications. As stated above, generally, for the preparation of these polymers, the dehydration step may be unnecessary. Certainly the monomer will be other than DCB. For certain polymerizations, such as those involving a poly(arylene sulfide) ketone) or poly(arylene sulfide diketone), the completed reaction mixture will be in the form of a slurry of solid particulate polymer in liquid components for conventional polymerization conditions, thus the resulting slurry should be heated to substantially liquify the resin prior to the addition of the separation agent. These and other modifications should be readily understood or discoverable by those of ordinary skill in the art without undue experimentation.

The particle size and bulk density of poly(arylene sulfide) resins, prepared as described herein, can be increased according to this invention. The poly(arylene sulfide) resin which is to be treated to increase the bulk density and particle size should first be redissolved or reslurried in a polar organic compound which can also function as a solvent for the resin. The polar organic compound can be chosen from those listed previously herein. If the poly(arylene sulfide) resin forms a slurry when placed in the polar organic compound, it is desirable to substantially liquify the particulate poly(arylene sulfide) resin. The resin can be substantially liquified according to any method known to one of ordinary skill in the art, such as for example the methods described previously herein.

The solution formed by dissolving the poly(arylene sulfide) resin in the polar organic compound, or the liquid mixture formed after the substantial liquification of the poly(arylene sulfide) resin in the polar organic compound, is then contacted with a sufficient amount of a vaporized separation agent, as previously described, and then the temperature of the liquid mixture is slowly reduced to a point below the poly(arylene sulfide) resin's liquid to solid phase transitional temperature. The amount of vaporized separation agent required is that previously described; however, it should be noted that the liquid mixture resulting from placing an already formed poly(arylene sulfide) resin in a polar organic compound will, in most cases, be different from the reaction mixture formed at the completion of the polymerization, due to the absence of components such as unreacted monomer, water present at the beginning of the polymerization or formed during the polymerization, and polymerization modifiers, such as for example alkali metal carboxylates. The amount of separation agent necessary to effect a phase separation agent can be determined readily and without undue experimentation by one of ordinary skill in the art. As a general guideline, the molar ratio of separation agent to polar organic compound will be in the range of about 0.001:1 to 10:1 when the molar ratio of polar organic compound to poly(arylene sulfide) polymer is in the range of about 5:1 to about 30:1.

This invention will be more fully understood from the following examples. These examples are only intended to demonstrate select embodiments of the invention and are in no way intended to limit the scope thereof.

EXAMPLE I

This Example demonstrates the recovery of a crystalline poly(arylene sulfide) resin by the novel process of this invention comprising the steps of adding a vaporized separation agent to a hot completed polymerization mixture or to a hot liquid mixture formed by heating a previously prepared poly(arylene sulfide) resin in a polar organic compound, cooling the polymerization or liquid mixture, and filtering the mixture to recover the crystalline poly(arylene sulfide) resin.

The poly(arylene sulfide) used in this Example is a poly(phenylene sulfide) (PPS) which had been prepared, recovered, and dried in an earlier process. Specifically, the PPS resin was initially prepared by reacting 85 lbs. of 50 wt. percent NaOH, 104 lbs. of 59 wt. percent NaSH, 28 gals. N-methyl-2-pyrrolidone (NMP), and 164 lbs. p-dichlorobenzene (DCB), under the polymerization conditions such as those disclosed in U.S. Pat. No. 3,354,129, which disclosure is hereby incorporated by reference. The resulting polymeric resin had a melt flow rate as determined by ASTM D1238 (condition 315/5.0) (modified to use a 6 min. preheat time) of approximately 15,000 g/10 min.

To simulate reaction conditions, a 250-gram sample of the above PPS resin was charged into a one gallon polymerization reactor along with 1000 mL NMP, 60 grams sodium acetate (NaOAc) and approximately 50 mL water. The reactor was then purged with nitrogen gas while being heated to 260° C. (500° F.). The internal temperature of the reactor was held at 260° C. (500° F.) for approximately one-quarter hour. Henceforth, this PPS liquid "reaction" mixture will be referred to as Mixture 1.

In a separate one-half liter vaporization cylinder, 300 mL of water was charged. The cylinder was then sealed and heated to 254° C. (489° F.), resulting in an internal pressure of 600 psig.

Steam was charged, over a 10-minute period, from the top of the one half liter sealed vaporization cylinder into the polymerization reactor containing Mixture 1. Upon charging the steam into the polymerization reactor, the internal temperature of the reactor dropped from 258° C. (496° F.) to 256° C. (493° F.), while the internal pressure increased from 140 psig to 300 psig. After the 10-minute charging period, the steam to the reactor was terminated and the contents of the reactor were permitted to cool. The amount of vaporized water (i.e., steam) charged into the reactor and a visual, qualitative observation of the reactor's contents after cooling the reactor are recorded in Table I.

For the purpose of further demonstrating the effectiveness of the present invention, three additional PPS liquid "reaction" mixtures (i.e., Mixtures 2–4, inclusive) were prepared. These mixtures were prepared by using 250-gram samples of the same PPS polymer made above. These PPS samples were also reheated to form hot "reaction" mixtures in accordance with the same procedure set out for Mixture 1. The only difference between the preparation of Mixtures 2–4 and that of Mixture 1 was the separation agent employed. Specifically, for Mixture 2, 200 mL of water at 25° C. at atmospheric pressure was used as the separation agent. For the solution designated as Mixture 3, 300 mL of water at 249° C. (480° F.) at 550 psig was used as the separation agent. For Mixture 4, no separation agent was added. The results observed when the different separation agents were employed are recorded in Table I.

lbs. of 58 wt. percent NaSH, 28 lbs. of sodium acetate (NaOAc), 36 gals. of N-methyl-2-pyrroldione (NMP), and 133 lbs. of p-dichlorobenzene (DCB), under polymerization conditions such as those disclosed in U.S. Pat. No. 3,919,177, the disclosure of which is hereby incorporated by reference. The resulting polymeric resin had a melt flow rate, as determined by ASTM D1238, (Condition 315/5.0) (modified to use a 5 min. preheat time), of approximately 300 g/10 min.

To simulate reaction conditions, a 250-gram sample of the above modified PPS resin was charged into a one-gallon polymerization reactor along with 1000 mL NMP, 60 grams sodium acetate (NaOAc) and approximately 50 mL water. The reactor was then purged with nitrogen gas while being heated to 260° C. (500° F.). The internal temperature of the reactor was held at 260° (500° F.) for approximately one-half hour. Henceforth,

TABLE I

Effects of Using a Vaporized Liquid as a Separation Agent

| Mixture No. | Separation Agent | | | Reaction (Start)[a] | | Reaction (End)[b] | | Temp. Change[c] (°C.) | Observation |
|---|---|---|---|---|---|---|---|---|---|
| | Type | Charged Amt. (mL) | Temp. (°C.) | Temp. (°C.) | Press. (psig) | Temp. (°C.) | Press. (psig) | | |
| 1 | Steam | 150[d] | 254[e] | 258 | 140 | 256 | 300 | 2 | Uniform particles; little coating on coils |
| 2 | Water | 200 | 25 | 260 | 150 | 234 | 275 | 26 | Non-uniform particles; coating on coils |
| 3 | Water | 300 | 249[f] | 260 | 150 | 238 | 320 | 22 | Non-uniform particles; coating on coils |
| 4 | None | — | — | 260 | 130 | — | — | — | Powder |

[a] Reactor conditions prior to adding any separation agent.
[b] Reactor conditions after the addition of the separation agent.
[c] Change in the internal temperature of the reactor after the addition of the separation agent.
[d] Charged amount determined by subtracting the amount of water remaining in the charging cylinder after cooling (i.e., 160 mL) from the initial amount of water added to the charging cylinder (i.e., 300 mL).
[e] Steam temperature determined by using The American Society of Mechanical Engineers (ASME) Steam Tables after allowing 14.7 psi for atmospheric pressure and a charging cylinder internal pressure of 600 psig.
[f] Water temperature determined by using ASME Steam Tables allowing 14.7 psi for atmospheric pressure and a charging cylinder internal pressure of 550 psig.

The results recorded in Table I demonstrate that without the addition of any separation agent (i.e., Mixture 4), the resulting polymer is in the form of a powder. Moreover, while the use of a liquid separation agent such as water (i.e., Mixture 2), results in the formation of particles, these particles are generally not uniform in size and tend to adhere to one another as well as to the internal walls of the reactor. A comparison of Mixture 3 with Mixture 1 demonstrates that even when the liquid separation agent is introduced at a temperature similar to that of the vaporized separation agent, the use of the liquid agent still results in the agglomeration of polymeric particles. As can clearly be seen by the data of Table I, when a vaporized separation agent, such as steam, is employed (Mixture 1), the result is a polymer having uniform particle size and little, if any, product adheres to the internal walls and parts of the reactor.

EXAMPLE II

This Example demonstrates the recovery of a crystalline poly(arylene sulfide) resin by the novel process of this invention comprising the steps of adding a vaporized separation agent to a hot completed polymerization mixture, cooling the polymerization mixture, and filtering the mixture to recover the crystalline poly(arylene sulfide) resin.

The liquid "reaction" mixture of this Example was prepared by reheating a poly(phenylene sulfide) (PPS) resin modified by an alkali metal carboxylate which had been prepared, recovered, and dried in an earlier process. Specifically, the modified PPS resin was initially prepared by reacting 69 lbs. of 50 wt. percent NaOH, 89 this modified PPS liquid "reaction" mixture will be referred to as Mixture 5.

In a separate one-half liter vaporization cylinder, 300 mL of water was charged. The cylinder was then sealed and heated to 250° C. (482° F.), resulting in an internal pressure of 600 psig.

Steam was charged from the top of the one-half liter sealed vaporization cylinder into the polymerization reactor containing Mixture 5. Upon charging the steam into the polymerization reactor, the internal temperature of the reactor dropped from 260° C. (500° F.) to 253° C. (487° F.), while the internal pressure increased from 150 psig to 210 psig. After the charging period, the steam to the reactor was terminated and the reactor contents were permitted to cool. The amount of vaporized water charged into the reactor and a visual qualitative observation of the reactor's contents after cooling are recorded in Table II.

For the purpose of demonstrating the effectiveness of the present invention, two additional modified PPS liquid "reaction" mixtures (i.e., Mixtures 6 and 7, inclusive), were prepared from resin taken from the same modified resin batch prepared above, wrein the resins were also reheated into separate "reaction" liquid mixtures in accordance with the same procedure set out for Mixture 5. The only significant difference between the preparation of and recovery of the resins for Mixtures 6 and 7, as opposed to that of Mixture 5, was the separation agent employed. Specifically, for Mixture 6, 150 mL of water at 25° C. (77° F.) at atmospheric conditions, were used as the separation agent. For Solution 7, no separation agent was added. The results observed, when the different separation agents were employed, are recorded in Table II.

Steam was introduced into the polymerization reactor containing Mixture 8 through a series of six separate charges from the top of the one-half liter sealed vapori-

TABLE II

Effects of Using a Vaporized Liquid as a Separation Agent for Recovery of a Modified Polymer

| Mixture No. | Separation Agent (Quenching Media) | | | Reaction (Start)[a] | | Reaction (End)[b] | | Temp. Change[c] (°C.) | Observation |
|---|---|---|---|---|---|---|---|---|---|
| | Type | Charged Amt. (mL) | Temp. (°C.) | Temp. (°C.) | Press. (psig) | Temp. (°C.) | Press. (psig) | | |
| 5 | Steam | 45[d] | 254[e] | 260 | 150 | 253 | 210 | 7 | Uniform particles; little coating on coils |
| 6 | Water | 150 | 25 | 260 | 150 | 242 | 300 | 18 | Non-uniform particles; coating on coils |
| 7 | None | — | — | 260 | 140 | — | — | — | Powder |

[a]See footnote "a" of Table I.
[b]See footnote "b" of Table I.
[c]See footnote "c" of Table I.
[d]Charged amount determined by subtracting the amount of water remaining in the charging cylinder after cooling (i.e., 280 mL) from the initial amount of water added to the charging cylinder (i.e., 325 mL).
[e]See footnote "e" of Table I.

The results recorded in Table II demonstrate that without the addition of any separation agent (i.e., Mixture 7), the polymer is in the form of a powder. However, while the use of a liquid separation agent, such as water (i.e., Mixture 6), results in the formation of particles, these particles are generally not uniform in size and tend to adhere to one another as well as to the internal walls of the reactor. As can clearly be seen by the data of Table II, when a vaporized separation agent, such as steam (i.e., Mixture 5) is employed, the result is a polymer having uniform particle size and little, if any, product adheres to the internal walls and parts of the reactor.

EXAMPLE III

This Example demonstrates the recovery of a semi-crystalline poly(arylene sulfide) resin by the novel process of this invention. The semi-crystalline poly(arylene sulfide) used to demonstrate the effectiveness of the invention in this Example is poly(phenylene sulfide ketone) (PPSK).

In a manner similar to the earlier examples, the liquid "reaction" mixture was prepared by reheating in a polar organic compound a poly(arylene sulfide), in this instance PPSK, which had been prepared, recovered, and dried in earlier processes. Specifically, PPSK resin was initially prepared in batches by reacting 250 grams of dichlorobenzophenone (DCBP), 1200 mL N-methyl-2-pyrrolidone (NMP), 40 grams NaOH, 95 grams of 0.59 weight percent aqueous NaSH solution, and 58 mL water, in a nitrogen atmosphere at 250° C. (482° F.) for 3 hours under a pressure of 200 psig. The resulting polymer had a melt flow rate as determined by ASTM D1238, (Condition 371/5.0) (modified to use a 5 min. preheat time), of approximately 419 g/10 min.

To stimulate reaction conditions and substantially liquify the PPSK to result in a liquid "reaction" mixture, a first 225-gram sample of the above PPSK resin was charged into a one-gallon polymerization reactor along with 1200 mL NMP and 75 mL water. The reactor was then purged with nitrogen gas while being heated to 300° C. (572° F.). The internal temperature of the reactor was held at 300° C. (572° F.) for approximately 15 minutes. Henceforth, this PPSK liquid "reaction" mixture will be referred to as Mixture 8.

In a separate one-half liter vaporization cylinder, 375 mL of water were charged. The cylinder was then sealed and heated to 254° C. (489° F.), resulting in an internal pressure of 600 psig.

Steam was introduced into the polymerization reactor containing Mixture 8 through a series of six separate charges from the top of the one-half liter sealed vaporization cylinder. The change in reaction temperature and pressure after each steam charge is recorded in Table III.

After the sixth charge of steam, the contents of the reactor were permitted to cool. The total amount of vaporized water charged into the reactor over all six charges and a visual qualitative observation of the reactor's contents after cooling are recorded in Table III.

A second 193-gram sample of the above PPSK resin was then charged to another one-gallon polymerization reactor along with 1,000 mL NMP and 75 mL water. The reactor was purged with nitrogen while being heated to 300° C. (572° F.). The internal temperature of the reactor was held at 300° C. (572° F.) for approximately 15 minutes. Henceforth, this PPSK liquid "reaction" mixture will be referred to as Mixture 9.

In a separate one-half liter vaporization cylinder, 375 mL of water were charged. The cylinder was then sealed and heated to 254° C. (489° F.), resulting in an internal pressure of 600 psig.

Steam was introduced into the polymerization reactor containing Mixture 9 through a series of four separate charges from the top of the one-half liter sealed vaporization cylinder. The change in reaction temperature and pressure for each steam charge is recorded in Table III.

After the fourth charge of steam, the contents of the reactor were permitted to cool. The total amount of vaporized water charged into the reactor over all four charges and a visual qualitative observation of the reactor's contents after cooling are recorded in Table III.

A third 200-gram sample of the above PPSK resin was charged to yet another one-gallon polymerization reactor along with 1,000 mL NMP and 54 mL water. The reactor was purged with nitrogen gas while being heated to 300° C. (572° F.). The internal temperature of the reactor was held at 300° C. (572° F.) for approximately 15 minutes. Henceforth, this PPSK liquid "reaction" mixture will be referred to as Mixture 10.

In a separate one-half liter vaporization cylinder, 375 mL of water were charged. The cylinder was then sealed and heated to 254° C. (489° F.), resulting in an internal pressure of 600 psig.

Steam was introduced into the polymerization reactor containing Mixture 10 through a series of three separate charges from the top of the one-half liter sealed vaporization cylinder. The change in reaction temperature and pressure after each steam charge is recorded in Table III.

After the third charge of steam, the contents of the reactor were permitted to cool. The total amount of vaporized water charged into the reactor over all three charges and a visual qualitative observation of the reactor's contents after cooling are recorded in Table III.

For the purpose of demonstrating the effectiveness of the present invention, a fourth PPSK resin sample was reheated into a liquid "reaction" mixture in accordance with the same procedure set out for Mixture 10. The only significant difference between the preparation of Mixture 10 and that of Mixture 11 was the form in which the separation agent was employed. Specifically, 125 mL of water at 25° C. (77° F.) at atmospheric pressure was used as the separation agent for Mixture 11. The results observed when water (as opposed to steam) was used as the separation agent are recorded in Table III.

TABLE III

Effects of Using a Vaporized Liquid as a Separation Agent for a Modified PPSK Polymer

| Mixture No. | Separation Agent (Quenching Media) | | | Steam Charge No. | Reaction (Start)[a] | | Reaction (End)[b] | | Temp. Change[c] (°C.) | Observation |
|---|---|---|---|---|---|---|---|---|---|---|
| | Type | Charged Amt. (mL) | Temp. (°C.) | | Temp. (°C.) | Press. (psig) | Temp. (°C.) | Press. (psig) | | |
| 8 | Steam | 130[d] | 254[e] | 1 | 305 | 260 | 305 | 300 | 0 | Uniform Particles; no coating on coils |
| | | | | 2 | 305 | 300 | 303 | 325 | 2 | |
| | | | | 3 | 295 | 310 | 294 | 350 | 1 | |
| | | | | 4 | 288 | 340 | 284 | 360 | 4 | |
| | | | | 5 | 280 | 350 | 278 | 360 | 2 | |
| | | | | 6 | 272 | 340 | 271 | 350 | 1 | |
| 9 | Steam | 125[d] | 254[e] | 1 | 282 | 240 | 281 | 300 | 1 | Uniform particles; no coating on coils; |
| | | | | 2 | 270 | 260 | 270 | 300 | 0 | |
| | | | | 3 | 268 | 300 | 268 | 330 | 0 | |
| | | | | 4 | 270 | 330 | 270 | 350 | 0 | |
| 10 | Steam | 75[d] | 254[e] | 1 | 277 | 200 | 272 | 275 | 5 | Uniform particles; no coating on coils |
| | | | | 2 | 264 | 250 | 262 | 300 | 2 | |
| | | | | 3 | 259 | 275 | 259 | 300 | 0 | |
| 11 | Water | 125 | 25 | 1 | 300 | 267 | 277 | 450 | 23 | Non-uniform particles; coating on coils |

[a]See footnote "a" of Table I.
[b]See footnote "b" of Table I.
[c]See footnote "c" of Table I.
[d]Charged amount determined by subtracting the amount of water remaining in the charging cylinder after cooling (i.e., 245 ml) from the initial amount of water added to the charging cylinder (i.e., 375 ml).
[e]See footnote "e" of Table I.

The results recorded in Table III demonstrate that while the use of a liquid separation agent such as water results in the formation of particles, (i.e., Mixture 11), these particles are generally not uniform in size and tend to adhere to one another as well as to the internal walls of the reactor. As can be clearly seen by the data of Table III, when vaporized separation agents such as steam (i.e., Mixtures 8–10) are employed, the result is a polymer having uniform particle size and little, if any, product adheres to the internal walls and parts of the reactor.

It is evident from the foregoing that various modifications can be made to the embodiments of this invention without departing from the spirit and scope thereof which will be apparent to those skilled in the art. Having thus described the invention, it is claimed as follows.

That which is claimed is:

1. A method for recovering a poly(arylene sulfide) from a liquid mixture comprising a liquid-phase poly(arylene sulfide), a polar organic compound and water said method comprising:
   (a) contacting said liquid mixture with an effective amount of a vaporized separation agent, wherein said vaporized separation agent is a vaporized liquid which, when in its liquid-phase, is characterized as soluble in said polar organic compound and is a nonsolvent for poly(arylene sulfide) resins, wherein said separation agent is present in an amount necessary to effect a phase separation between said poly(arylene sulfide) and said polar organic compound;
   (b) reducing the temperature of said liquid mixture sufficiently to solidify said liquid-phase poly(arylene sulfide) to form a slurry comprising a particulate poly(arylene sulfide); and
   (c) recovering said particulate poly(arylene sulfide) from said slurry.

2. A method of claim 1 wherein the molar ratio of said vaporized separation agent to said liquid-phase poly(arylene sulfide) ranges from about 0.1:1 to about 100:1, and the molar ratio of said vaporized separation agent to said polar organic compound ranges from about 0.001:1 to about 10:1.

3. A method of claim 1 wherein the liquid form of said vaporized separation agent is selected from the group consisting water, paraffinic hydrocarbons, higher boiling alcohols, and higher boiling ethers.

4. A method of claim 3 wherein the liquid form of said vaporized separation agent is water.

5. A method of claim 1 wherein said poly(arylene sulfide) is poly(phenylene sulfide).

6. A method of claim 1 wherein said liquid further comprises an alkali metal carboxylate.

7. A method for recovering a particulate poly(arylene sulfide) from a completed polymerization reaction resulting in a liquid reaction mixture comprising a liquid-phase poly(arylene sulfide), a polar organic compound, and water, said method comprising:
   (a) contacting said liquid reaction mixture with a vaporized separation agent in an amount at least sufficient to effect a phase separation of said liquid-phase poly(arylene sulfide) component from said polar organic solvent component, wherein said vaporized separation agent is a vaporized liquid which, when in its liquid phase, is characterized as soluble in said polar organic compound, a nonsolvent for poly(arylene sulfide), and able to effect a phase separation between said liquid-phase poly(arylene sulfide) and said polar organic compound:

(b) reducing the temperature of said liquid reaction mixture sufficiently to solidify said liquid-phase poly(arylene sulfide) to form a slurry comprising a particulate poly(arylene sulfide); and (c) recovering said particulate poly(arylene sulfide) from said slurry.

8. A method of claim 7 wherein the molar ratio of said vaporized separation agent to said poly(arylene sulfide) is in the range of about 0.1:1 to about 100:1, the molar ratio of said vaporized separation agent to said polar organic compound is in the range of 0.001:1 to about 10:1.

9. A method of claim 7 wherein the liquid form of said vaporized separation agent is selected from the group consisting of water, paraffinic hydrocarbons, higher boiling alcohols, and higher boiling ethers.

10. A method of claim 9 wherein the liquid form of said vaporized separation agent is water.

11. A method of claim 7 wherein said poly(arylene sulfide) is poly(phenylene sulfide).

12. A method of claim 7 wherein said poly(arylene sulfide) is poly(phenylene sulfide).

13. A method of claim 7 wherein an alkali metal carboxylate is present in said liquid reaction mixture.

* * * * *

UNITED STATES PATENT AND TRADEMARK OFFICE
CERTIFICATE OF CORRECTION

PATENT NO. : 4,963,651

DATED : October 16, 1990

INVENTOR(S) : Afif M. Nesheiwat

It is certified that error appears in the above-identified patent and that said Letters Patent is hereby corrected as shown below:

Columns 13, and 14, Table I, footnoted, "(i.e., 160 ml)", should be deleted.
Column 14, line 40, "300", should be --325--.
Column 17, claim 1, line 64, after "water", please insert --,--.
Column 18, claim 3, line 47, after "consisting" and before "water", please insert --of--.
Column 20, claim 11, line 9, delete "7" and insert --10--.

Signed and Sealed this

Fifth Day of May, 1992

Attest:

DOUGLAS B. COMER

*Attesting Officer*      *Acting Commissioner of Patents and Trademarks*